United States Patent [19]
Dodd et al.

[11] Patent Number: 5,339,073
[45] Date of Patent: Aug. 16, 1994

[54] ACCESS CONTROL EQUIPMENT AND METHOD FOR USING THE SAME

[75] Inventors: Harold Dodd, Blyth; Brian J. Stanier, Stockton on Tees, both of Great Britain

[73] Assignee: Identec Limited, Durham, England

[21] Appl. No.: 674,655

[22] Filed: Mar. 25, 1991

Related U.S. Application Data

[63] Continuation-in-part of Ser. No. 563,674, Aug. 3, 1990, abandoned, which is a continuation of Ser. No. 229,646, Aug. 8, 1988, abandoned.

[51] Int. Cl.[5] ............................................. G06F 7/04
[52] U.S. Cl. ......................... 340/825.31; 340/825.54; 340/825.02; 340/825.08
[58] Field of Search ............... 340/825.54, 825.47, 340/825.02, 825.08, 825.5, 825.69, 825.72, 825.48, 502, 504, 505, 313, 825.31, 825.49, 572; 455/31.1, 54.1

[56] References Cited

U.S. PATENT DOCUMENTS

| | | | |
|---|---|---|---|
| 4,071,908 | 1/1978 | Brophy et al. | 340/825.02 |
| 4,247,908 | 1/1981 | Lockhart, Jr. et al. | 455/38.1 |
| 4,471,345 | 9/1984 | Barrett, Jr. | 340/572 |

FOREIGN PATENT DOCUMENTS 2164825 3/1986 United Kingdom.

Primary Examiner—Michael Horabik
Attorney, Agent, or Firm—David P. Gordon

[57] ABSTRACT

Access control equipment includes an interrogation unit which emits an interrogation signal, and a plurality of transponders, each transponder having a stored identity code different from that of the other transponders. This identity code includes a plurality of fields each holding a selected information bit. The interrogation signal is controlled so as simultaneously to interrogate the fields of all transponders within range in a serial manner. A group reply signal is sent back to the interrogation unit from any transponder having, in the field being interrogated, a bit matching that required by the interrogation signal. The interrogation unit is arranged to determine, from the series of received reply signals, the identity of each and every valid transponder within range.

10 Claims, 3 Drawing Sheets

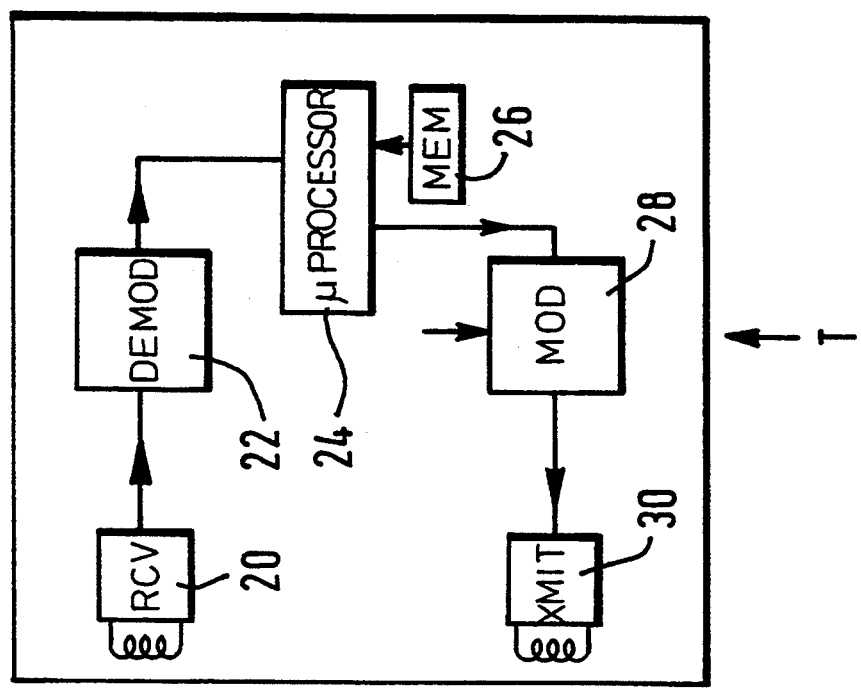
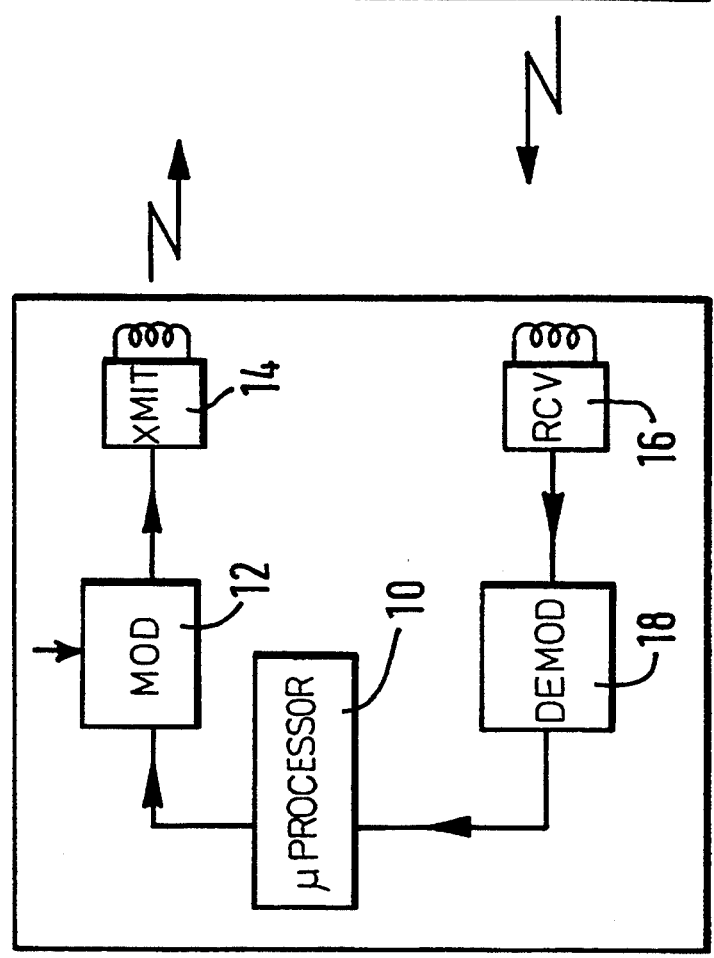
FIG. 1B.
FIG. 1A.

ACCESS CONTROL EQUIPMENT AND METHOD FOR USING THE SAME

This application is a continuation-in-part of application Ser. No. 07/563,674 filed Aug. 3, 1990, now abandoned, which in turn is a continuation of application Ser. No. 07/229,646 filed Aug. 8, 1988, also now abandoned.

BACKGROUND OF THE INVENTION

The present invention broadly relates to access control equipment, and more particularly to electronic equipment designed to restrict unauthorised access to stored or transmitted data or to secure premises.

The control of such access is frequently afforded by the use of an interrogation unit and a transponder. At its simplest, the interrogation unit transmits an enquiry signal which may be received by a transponder within its range. The transponder is designed to modify the received signal in a predetermined manner and then retransmits the modified signal for reception by the interrogation unit. The modifying of the signal may be such as simply to distinguish between any "authorized" transponder and an unauthorized one or may be characteristic of the specific transponder alone, in which latter case the modified signal received by the interrogation unit identifies that transponder and no other.

Thus, if the transponder is carried by a person, vehicle, animal or piece of equipment then the interrogation unit is enabled to permit or reject access of a specific person or vehicle to controlled premises or to control access of a person or equipment to stored data. For example, when the equipment is capable of receiving transmitted data, it may be permitted to do so only when it has been identified or authorized by a correctly-responding transponder.

Many systems for operating such equipment are known. For example, the interrogation unit may permanently or at intervals create a signal or field that will cause any transponder within range to identify itself. In a second system, any transponder coming within range will be caused to transmit an identifying signal to the interrogation unit. In a further alternative a transmission is initiated from the transponder and the interrogation unit processes the information so conveyed.

In such systems there is generally no problem in making a positive identification of a particular transponder, so long as that transponder is the only one within range of the interrogation unit, or the only one signalling the interrogation unit at a given time. Unless one of these criteria is met, then there can be difficulties in resolving the signals from the responders.

A further difficulty arises when the system protocol is such as to cause a transponder to transmit its same identifying signal more than once when traversing any interrogation field. Under these circumstances, the signal could be monitored by an unauthorised person, and thereafter reproduced in order to gain illicit access.

The present invention seeks to avoid these difficulties.

SUMMARY OF THE INVENTION

In accordance with this invention, there is provided access control equipment comprising:
a plurality of transponders; and
an interrogation unit having means for emitting interrogation signals and means for controlling said interrogation signals, said interrogation unit simultaneously interrogating all said transponders within range of said interrogation unit;

each of said plurality of transponders having means for receiving the interrogation signals, and means for storing an identity code different from that of other transponders, the identity code comprising a plurality of fields, each field holding information having a value selected from a plurality of possible values, wherein said means for controlling said interrogation signals causes said interrogation unit to simultaneously interrogate said transponders to determine the values of information held in a first field, then to interrogate those transponders which have selected values in the first field to determine the values which they hold in a second field, then to interrogate those transponders which have selected values in the first and second fields to determine the values which they hold in a third field, and so on until all fields have been interrogated, said plurality of transponders each further comprising means for sending a group reply signal to the interrogation unit upon that transponder having, in all fields being interrogated but the last, values which match those required by the interrogation signal, the group reply signal indicating the value which is held in the last of the fields being interrogated, wherein the selected values for each interrogation after the first are based upon the group reply signals received from the plurality of transponders, and the combinations of selected values sent in successive interrogations are narrowed such that only those combinations for which group reply signals have been received are sent, said interrogation unit further comprising means for converting group reply signals received in response to interrogation signals interrogating all fields, into the identity codes of those transponders within range.

It will be seen that the equipment can operate irrespective of the number of transponders within range. The interrogation unit will analyze the series of group reply signals and will be informed by those signals of the identity codes of those transponders present. The responses are thus unable to interfere, and there is clear resolution of the signals. Furthermore, it will be appreciated that a transponder only transmits an identity code once in one whole interrogation sequence. Further interrogation requires a different identity code from the same transponder thus rendering it extremely difficult for an unauthorised person successfully to monitor and decipher that code. During most of the sequence each transponder simply sends a group reply signal.

Preferably each identity code is a binary word, each field comprising one bit, either 0 or 1. Other codes could be used, but binary is clearly the simplest. The interrogation and response sequence is preferably computer controlled, both in the interrogation unit and in the transponder, and binary identity logic obviously simplifies such control.

All responders sending a group reply signal in response to interrogation of a particular field will do so simultaneously, desirably with an identical signal. It would be possible to have the responders reply serially, each with a different signal falling within a group but this is not as rapid a method as simultaneous reply.

When binary logic is used, the transponders are effectively divided into classes and sets, and the interrogation is effectively a binary tree search.

Also in accordance with this invention there is provided a method for determining the identity of transponders within range of an interrogation unit, wherein each transponder has means for storing a unique identity code comprised of values for a plurality of fields, and means for sending a group reply signal in response to an interrogation signal which matches the identity code, said method comprising:

(a) sending an interrogation signal from said interrogation unit to determine the values of information held by the transponders in a first field;

(b) receiving at said interrogation unit group reply signals sent by said transponders and indicating the values of information held by the transponders in the first field;

(c) based upon the group reply signals received in step (b), sending interrogation signals from said interrogation unit to said transponders identifying only those values for the previously interrogated field for which a group reply signal was received, and receiving at said interrogation unit group reply signals from said transponders which indicate the values of information held by those transponders in the second field;

(d) repeating step (c) until all values for a last of said plurality of fields are determined by sending combinations of selected values for the previous fields, based on reply signals received from those previous fields; and (e) from said group reply signals, determining the identity codes of those transponders within said range.

Additional objects and advantages of the invention will become apparent to those skilled in the art upon reference to the detailed description when taken in conjunction with the accompanying drawings.

BRIEF DESCRIPTION OF THE DRAWINGS

FIGS. 1A and 1B are diagrammatic block diagrams of access control equipment, showing an interrogation unit and one of a plurality of transponders of the equipment;

DETAILED DESCRIPTION OF THE PREFERRED EMBODIMENT

Figure 2:
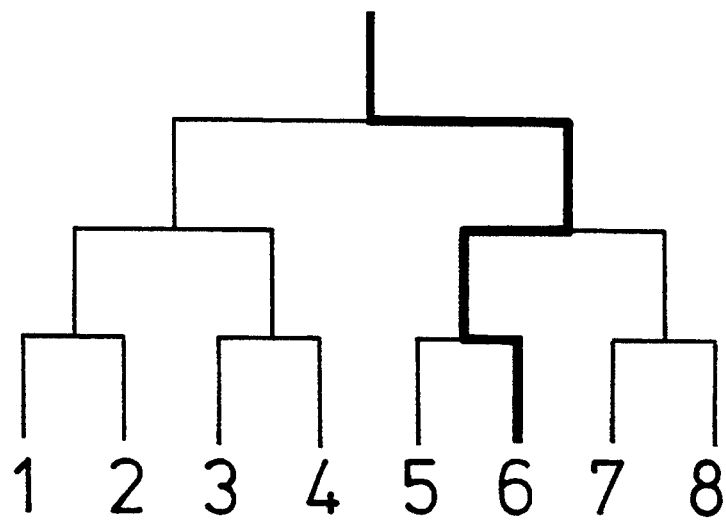
FIG. 2 is a diagram to illustrate a tree search form of the interrogation process where only one transponder is present in the field of the interrogation unit.

Referring to FIGS. 1A and 1B, there is shown an access control equipment comprising an interrogation unit IU and a plurality of transponders, one of which is shown at T. The interrogation unit IU comprises a microprocessor 10 one function of which is to generate interrogation signals and apply these to a pulse length modulator 12, which applies the modulated signals to a transmitter 14. The transmitter includes a coil for inductively coupling with a coil of a receiver 20 of the transponder or tag T. Receiver 20 of the transponder applies its received signal to a demodulator 22, the demodulated signal being applied to a microprocessor 24. This is able to refer to a memory 26 containing an identifying code of the transponder. The microprocessor 24 determines when a reply is to be made, in which case it provides a reply signal to a phase shift modulator. 28 driving a transmitter 30. A coil of this transmitter is inductively coupled with a coil of a receiver 16 of the interrogation unit and a demodulator 18 serves to recover the reply signal and pass this to the microprocessor 10 of the interrogation unit for decoding and identifying the transponder or transponders within range. The transmitting channel for the interrogation unit to the transponders may typically operate at 132 kHz and the reply channel may typically operate at 66 kHz.

The identifying code of each transponder may simply comprise a binary word. In use, the interrogation unit conducts a search by simultaneously interrogating the bits of all transponders within range in a serial manner. If any one or more transponders within range has a bit of predetermined value (e.g. 1) at the interrogated position in the binary word that transponder (or those transponders) will transmit a reply simply to indicate this. Then the search proceeds by interrogating another position in the binary word to see if any transponder within range has a bit of predetermined value at that position, and so on. By decoding the reply signals received from this success ion of interrogations, the microprocessor 10 in the interrogation unit can determine the identifying code of each transponder which is within range.

The interrogation process may take the form of a binary tree search. For example, in FIG. 2 a single transponder with code 6 is assumed to be present. The identification commences by enquiring whether the transponder is a member of set (1,2,3,4) or set (5,6,7,8). The transponder responds to the latter and sends a first group reply signal. At level two of the search the choice is between (5,6) or (7,8) and (5,6) is identified whereupon a second group reply signal is sent. Finally, the transponder is recognised as (6) after the sending of a third group reply signal and analysis by the interrogation unit. It may be convenient to regard the transponder identity as a binary number and each level of the search establishing 1 bit of the number. An n-bit number requires an n-level search and can identify 1 of $2^n$ transponders.

Only one interrogation is actually needed to establish to which set a single transponder belongs to each level. So n levels need n interrogations. Even for small n the search time is better than or equivalent to a simple polling of every single transponder identity code, but for higher values of n the saving becomes very large. For example, identification of 1 transponder from 65536 is possible with just 16 interrogations.

The simple search outlined above for a single transponder needs to be modified if multiple transponders are present. Every member of a set must respond to the IU when interrogated. This has three implications:

(a) If more than one member of a set is present all will respond. To avoid conflict they must either send identical replies simultaneously (so that the IU sees only one effective reply) or they may send different replies in sequence. The former is faster and does not require any timing or arbitration scheme.

(b) One or more transponders may be present in both sets at a tree level. It is then necessary to have two effective interrogations at each level instead of the single interrogation which was adequate for the single transponder case.

Figure 3:
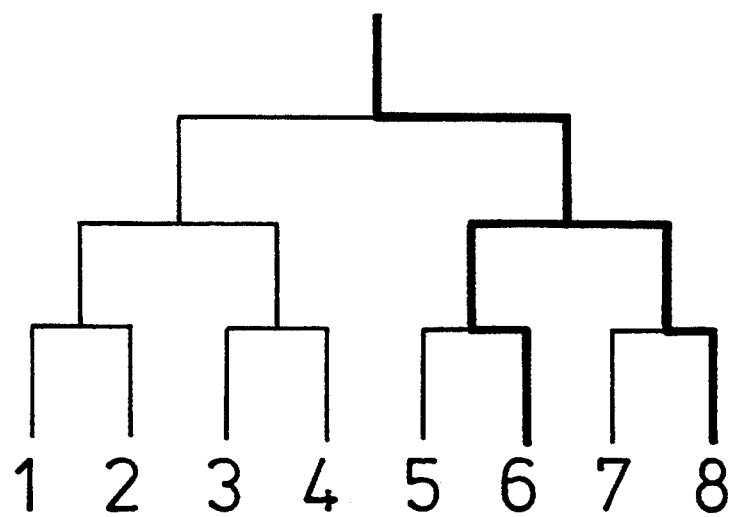
FIG. 3 is a similar diagram to illustrate the tree search when two transponders are present.

(c) The IU must remember when members of both sets at a given level are present and search both branches of the tree from that node to identify all the transponders present. FIG. 3 shows a possible search route for the case where both transponder 6 and transponder 8 are present.

An interrogation process will now be described in detail with reference to FIG. 3. Transponders 1 to 8 are coded 000 to 111, so that transponder 6 holds the code 101 and transponder 8 holds the code 111: these are the only two transponders which are present. Each interrogation step consists of the transmission of an interrogation signal from the interrogation unit, serving as a synchronising signal and also to select the field being examined. The first interrogation signal checks the first field: two possible time slots follow; any transponder with a 0 in the first field will send a response (or group reply signal) in the first time slot, whilst any transponder with a 1 in the first field will send a response (or group reply signal) in the second time slot. In the case shown in FIG. 3, no response will be received by the interrogation unit in the first time slot, because there is no transponder present with a 0 in its first field: but a response is received in the second time slot, indicating that there is one or more transponder present having a 1 in the first field. It can be said that there are one or more transponders 1?? present.

In the next interrogation step, the interrogation unit transmits a 1 as a field selection and synchronising interrogation signal, in order to check the second field of those transponders having a 1 in the first field. In the case of FIG. 3, a response (group reply signal) is received both in the first time slot and in the second, indicating that one or more transponders 10? are present, and also one or more transponders 11? are present. There is no need for the interrogation unit to transmit a 0, because the first interrogation step established that there are no transponders present with a 0 in the first field.

In the next interrogation step, the interrogation unit checks the third field. Firstly it transmits 10 as field selector and synchronising interrogation signal, in order to check the third field of those transponders having a 1 in the first field and a 0 in the second field. In the case of FIG. 3, no response is received in the first time slot (because there is no transponder 100 present), but a response is received in the second time slot, indicating the presence of transponder 101. Also however to complete the check on the third field, the interrogation unit must transmit 11 as field selector and synchronising interrogation signal, in order to check the third field of those transponders having a 1 in the first field and a 1 in the second field: now no response is received in the first time slot (because there is no transponder 110 present), but a response is received in the second time slot, indicating the presence of transponder 111.

The simplest (and fastest) tree search requires that the IU sends an interrogation data word whose length is the minimum needed to identify the search level. At level 1 only 1 bit is needed. Level 2 needs 2 bits etc. The final level requires an n-bit word.

Figure 4:
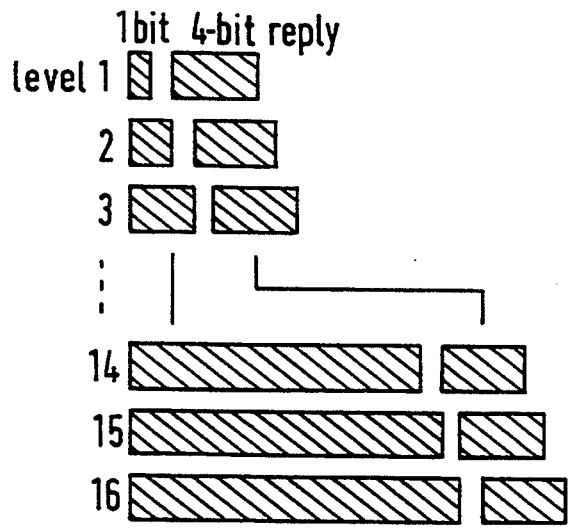
FIG. 4 is a diagram to illustrate the data exchange for a 16-bit identifying code of the transponder.

In principle the reply need only be a 1-bit word at any and every level. However it is preferable for the transponder to do some processing of the incoming data and a 4-bit reply is a suitable compromise between speed and complexity. Very little time can be allowed between receipt of the incoming data and the appropriate reply to avoid impeding the search and a simple pseudo-random sequence generation process yielding the 4-bit reply is an adequate compromise between speed and security at this stage. This form of data exchange is shown in FIG. 4 for the example of a 16-bit tag code.

For security it is desirable that the transponder replies differ on successive searches. A simple way of ensuring this is to provide a new seed for the pseudo-random sequence generation at the beginning of each search. The seed would be generated by the IU (and could itself be part of a pseudo-random sequence). Transmission of (say) a 16-bit seed can replace the 1st level interrogation. This word can also be used as a synchronising signal to the transponder(s) for the start of a search.

Figure 5:
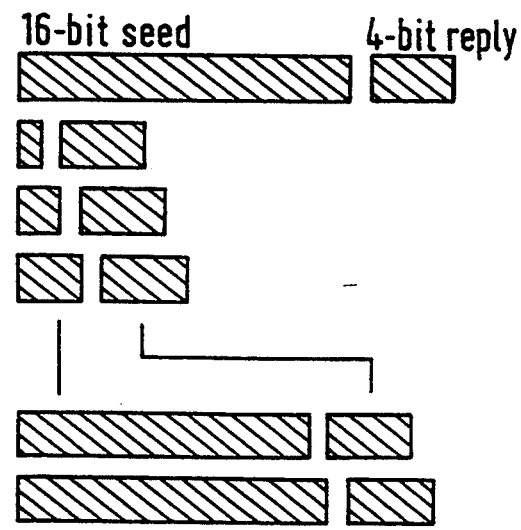
FIG. 5 is a similar diagram to illustrate the data exchange when a new 16-bit seed is transmitted on each search.

The search pattern then becomes as shown in FIG. 5. Note that the interrogation words for levels 2–16 can be reduced by 1 bit.

The transponder identity code revealed by the tree search is not in itself secure. It (or something equivalent to it) could possibly be deduced from a study of the search pattern and the corresponding replies. The security at this stage comes from the correct electronic and numerical forms of the replies and their relation to the interrogation data as determined by the transponder processor program. This is effectively the group reply signals and the code may be termed the public transponder identity code.

Further security is provided by a verification procedure in which a transponder replies to the final interrogation with a 16-bit reply e.g. generated from the seed provided at the beginning of the search, from an internally stored or hidden 16-bit code e.g. and, if desired, from the public transponder identity code. According to the stored algorithm this can only occur at the last search level because only then can no more than one transponder reply at a time.

The hidden code is derived from the public transponder code and a system key or code by any suitable algorithm. The IU could then regenerate the proper hidden code (and the appropriate transponder identified by the search therefrom).

The use of a key in the latter method allows customising a transponder set to a particular installation. For example, if the key is a 16-bit number then the total effective transponder code becomes 32 bits i.e. $4 \times 10^9$ different transponder identities. (65536 transponders in each of 65536 installations).

Figure 6:
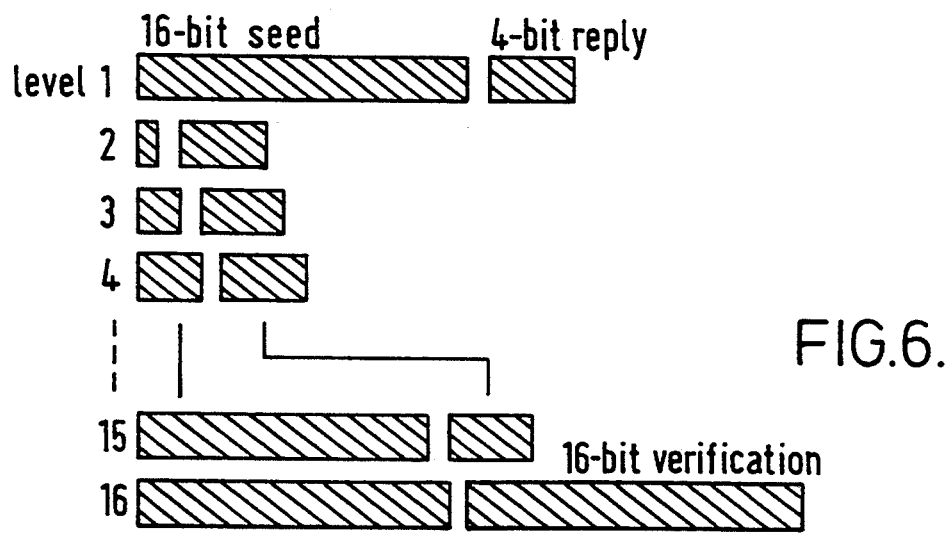
FIG. 6 is a similar diagram but where the transponder is arranged to return a hidden transponder code at the end of the search.

FIG. 6 shows the information exchange for a typical single transponder search including the initial seed transmission and the final hidden transponder identity verification. The total data transmission to the transponder in this example requires 136 bits and the replies need 152 bits in this case.

The public and hidden transponder identities are held in the memory 26 of each transponder and are programmable. At initial power-up during manufacture, the identity codes will be set to some known values.

Programming after manufacture, and at any subsequent time, may be accomplished by transmitting the new identity codes to a transponder using an extension of the data exchange protocol outlined above.

For security reasons the programming messages are only accepted by a transponder immediately following a successful search and verification procedure and must contain sufficient error detection to avoid false programming.

The transponders utilised in the invention are desirably encapsulated transponders as described in GB-A-2164825, but utilising either a microchip processor and memory or customised large scale integrated circuits instead of the logic elements shown in that document. Each transponder may or may not incorporate its own battery, but if a battery is incorporated the transponder is capable of switching from and to a standby, power conserving mode in response to the presence or absence of a signal from the interrogation unit.

It will be appreciated that in the equipment described, the interrogation unit uniquely identifies each and every valid transponder present within the range during one complete interrogation cycle. Preferably, as described above, the transponder reply signals differ on successive interrogation cycles and on successive search steps within each cycle, being encrypted according to a different control code (the seed) transmitted at the beginning of each cycle.

What is claimed is:

1. Access control equipment comprising:
    a plurality of transponders; and
    an interrogation unit having means for emitting interrogation signals and means for controlling said interrogation signals, said interrogation unit interrogating all said transponders within range of said interrogation unit;
    each of said plurality of transponders having means for receiving the interrogation signals, and means for storing an identity code different from that of other transponders, the identity code comprising a plurality of fields, each field holding information having a value selected from a plurality of possible values, wherein
    said means for controlling said interrogation signals causes said interrogation unit to simultaneously interrogate said transponders to determine the values of information held by said transponders in a first field, then to interrogate those transponders which have responded with the values they hold in the first field to determine the values which they hold in a second field, then to interrogate those transponders which have responded with the values they hold in the first and second fields to determine the values which they hold in a third field, and so on until all fields have been interrogated,
    said plurality of transponders each further comprising means for sending group reply signals to the interrogation unit, said group reply signals containing the value which is held by the transponder in the field being interrogated,
    wherein each interrogation after a first interrogation is based upon the group reply signals received from the plurality of transponders, and successive interrogations are narrowed such that only those transponders for which group reply signals have been received are further interrogated, said interrogation unit further comprising means for converting group reply signals received in response to interrogation signals interrogating all fields, into the identity codes of those transponders within range.

2. Access control equipment according to claim 1, wherein:
    said means for controlling said interrogation signal includes means for generating a control code at the beginning of an interrogation, and
    said means for sending group reply signals comprises means for encrypting said group reply signals in accord with said control code transmitted by said interrogation unit.

3. Access control equipment according to claim 2, wherein:
    said means for storing an identity code further comprises means for storing an algorithm, and
    said means for sending group reply signals further comprises means for generating an encoded signal from the control code transmitted at the beginning of the interrogation and from the identity code and the algorithm stored in said means for storing, wherein said means for sending group reply signals sends said encoded signal at an end of an interrogation when said means for sending is part of a valid transponder within said range.

4. Access control equipment according to claim 1, wherein:
    said plurality of possible values comprises values of one and zero.

5. Access control equipment according to claim 3, wherein:
    said plurality of possible values comprises values of one and zero.

6. A method for determining the identity of transponders within range of an interrogation unit, wherein each transponder has means for storing a unique identity code comprised of values for a plurality of fields, wherein each value is selected from a plurality of possible values, and means for sending a group reply signal in response to an interrogation signal, said method comprising:
    (a) sending a first interrogation signal from said interrogation unit to determine the values of information held by the transponders in a first field;
    (b) receiving at said interrogation unit first group reply signals sent by responding transponders, said first group reply signals containing the values of information held by the responding transponders in the first field;
    (c) based upon the first group reply signals received in step (b), sending a second interrogation signal from said interrogation unit only to said responding transponders;
    (d) receiving at said interrogation unit second group reply signals from said responding transponders said second group reply signals containing the values of information held by the responding transponders in the second field;
    (e) repeating steps (c) and (d) until all fields have been interrogated; and
    (f) from said group reply signals, determining the identity codes of those transponders within said range.

7. A method according to claim 6, further comprising:
    (g) generating and sending from said interrogation unit to said transponders a control code at the beginning of an interrogation, and
    (h) encrypting and sending from said transponders to said interrogation unit said group reply signals in accord with said control code generated.

8. A method according to claim 7, wherein said means for storing a unique identity code further comprises means for storing an algorithm, and said method further comprises:
    (i) generating an encoded signal from said control code generated at said generating step, from the unique identity code, and from the algorithm stored in said means for storing, and
    (j) sending said encoded signal generated at step (i) at an end of an interrogation when said means for sending is part of a valid transponder within said range.

9. A method according to claim 6, wherein:
    said possible values comprises values of one and zero.

10. A method according to claim 8, wherein:
    said possible values comprises values of one and zero.

* * * * *